United States Patent

Wenzel

[15] 3,675,086

[45] July 4, 1972

[54] ELECTRICAL ELEMENT LAMINATED IN STRUCTURE

[72] Inventor: Kurt Wenzel, Vienna, Austria

[73] Assignee: Telephon-und Telegraphen-Fabriks A.G. Kapsch & Sohne, Vienna, Austria

[22] Filed: June 29, 1970

[21] Appl. No.: 50,537

[30] Foreign Application Priority Data

Jan. 26, 1970 Austria ...................... A 672/70

[52] U.S. Cl. .......................... 317/230, 317/261
[51] Int. Cl. ........................... H01g 9/05
[58] Field of Search .............. 317/230; 29/570, 25.41

[56] References Cited

UNITED STATES PATENTS

| | | | |
|---|---|---|---|
| 3,054,029 | 9/1962 | Wagner et al. | 317/230 |
| 3,100,329 | 8/1963 | Sherman | 29/25.31 |
| 3,254,390 | 6/1966 | Shtassel | 29/25.31 |
| 3,397,446 | 8/1968 | Sharp | 29/570 |

Primary Examiner—James D. Kallam
Attorney—Ernest F. Marmorek

[57] ABSTRACT

The laminated electrical element, such as an electrolytic capacitor, voltage sensitive capacitor and the like, comprises, successively arranged, a highly porous substrate of a metal of the fifth group of the periodic system, an oxide film of said substrate metal, an electrolytically deposited oxide layer of a metal of the seventh group of the periodic system and a semiconductive intermediate (mixing) zone resulting between the oxide film and the oxide layer. The thickness of the oxide layer of a metal of the seventh group is in the range of five to 200 molecules.

4 Claims, 4 Drawing Figures

ELECTRICAL ELEMENT LAMINATED IN STRUCTURE

BACKGROUND OF THE INVENTION

In the production of electronic laminated components, such as of electrolytic capacitors, for example, a solid semiconductive electrolyte is deposited on a roughened foil or on a sintered wafer of aluminum, tantalum and the like, usually by means of pyrolysis of a binding film which has been applied to the semiconductor by dipping the latter into a thermally decomposable binding substance. The disadvantage of such known process resides in the fact that the conductivity of the binding film produced, for example by dipping the semiconductive layer into a 58 percent solution of a manganese nitrate and by pyrolysing the resulting film into a manganese dioxyde, is insufficient in many instances and, consequently, the loss angle of the completed capacitor is too high.

In addition, the coatings which have been produced by the pyrolitic process do not provide a sufficient protection against chemical attacks such as, for instance, against the deteriorating effects of nitrosic vapors resulting during the pyrolysis. Moreover, from the mechanical point of view the pyrolitically deposited layers are very fragile which fact is particularly disadvantageous in the manufacturing of wound capacitors.

To remove the above mentioned disadvantages, it has been already suggested how to produce capacitors having an electrolytically deposited semiconductive layer. This process encounters, however, the shortcoming of condensers manufactured by the pyrolysis techniques in that it results into an unduly low operating voltage at reduced nominal capacity. For this reason, the positive electrode (anode) of the electrolytic condenser has been provided with a semiconductive layer made by the cathodic reduction of an acqueous solution of a semiconductive metallic compound having a higher valence than that of the semiconductive oxide which is produced during the process. Subsequently, the oxide barrier layer is deposited in a formation bath and additional one or more electrolytic depositions of the semiconductive oxide may follow. By means of this process, it is possible to deposit on a lightly etched aluminum or tantalum foil a first coating of a manganese dioxide made of a 2 percent solution of a potassium permanganate at an increased temperature (50° to 90° C) during a treatment period of 30 minutes by 0.8 mA/cm². After the activation and another electrolytic deposition and after the finishing, a capacitor having improved electrical properties is produced (DBP 1,147,696 to Fansteel and U.S. Pat. No. 3,254,390).

Nevertheless, even the above described production method has proved as being unsuitable for a highly porous anode material since it has appeared that the numerous minute pores of a roughened foil or of a porous sintered body of a rectifying metal cannot be successfully coated by the desired complete and uniform layer of a solid semiconductive oxide.

Furthermore, there are known methods where polymere organic compounds are combined with manganese oxides to produce semiconductive layers that are employed particularly for dry electrolytic capacitors (DAS 1,904,700). Similarly, as in the previously described processes, the latter methods cannot be applied in case of extremely roughened surfaces of rectifying metal foils or of sintered bodies of metals where the effective surface is greatly extended, since due to the employment of concentrated solutions from which the semiconductor is separated or due to the separation at an increased temperature from acid solutions, the resulting by-products cause that the pores are clogged by impurities which prevent the entire surface of the rectifying metal from being coated with uniform, consistent and electrically conductive layer.

For example, to make full use of the high porosity of a suitable sintered body such as for instance of tantalum, for the production of an electrolytic capacitor with solid semiconductive laminations, it is desired that the entire upper surface contour of this sintered body be coated by a conductive layer. In coating highly roughened foils of a rectifying metal it is also advantageous that in order to reduce the loss angle of the capacitor the aforementioned semiconductive layer be applied. Besides, this semiconductive layer is supposed to enable that simultaneously with the capacitor or in addition to it, voltage sensitive resistors and diodes by means of simple known processes could be produced on the same surface and combined in a known manner into integrated circuits.

SUMMARY OF THE INVENTION

It is therefore an object of this invention to provide an electric construction element which avoids the above mentioned disadvantages of prior art.

More particularly, it is an object of this invention to create a construction element having laminations on a porous metal substrate which would uninterruptedly and uniformly cover the entire porous surface of the substrate.

Another object of this invention is to provide an intermediate layer (a mixing zone) between two laminations which has semiconductive properties.

Still another object of this invention is to utilize the semiconductive intermediate layer between two laminations for forming an electrolytic capacitor and/or various voltage sensitive electrical components such as capacitors, diodes, resistors and the like.

In accordance with this invention, the above objects are attained by providing a laminated construction element having a very porous base or substrate of a metal of the fifth group of the periodic system, an oxide layer of this substrate metal a second oxide layer of a metal of the seventh group of the periodic system forming a complete and uniform layer without interruptions and of the thickness in the range of five to 200 molecules, preferably from 30 to 100 molecules, and an intermediate (mixing) zone resulting between the two oxide layers and having semiconductive properties.

The method of producing the electric construction element of this invention is based on the steps of depositing electrolytically a first layer of the metal oxide of a metal of the seventh group on the porous substrate of the metal of the fifth group only until the thickness in the range of five to 200 molecules, preferably 30–100 molecules, is obtained, then activating or forming (oxidizing) the substrate metal to produce a thin oxide layer thereof in contact with the electrolytically deposited metal or metal oxide layer whereby an intermediate (mixing) semiconductive layer results between the oxide layer on the substrate and the electrolytically deposited metal oxide layer. The desired thickness of the metal oxide layer of the group VII metal, namely in the range of five to 200 molecules, preferably between 30 to 100 molecules, can be attained during a cathodic precipitation process on the highly porous metal substrate by means of corresponding adjustments of the concentration of the solution, of the temperature and of the current intensity.

BRIEF DESCRIPTION OF SEVERAL VIEWS OF THE DRAWING

The above stated as well as further objects and advantages of the present invention will become apparent upon a reading of the following detailed description taken in conjunction with the drawing, in which.

DETAILED DESCRIPTION

Figure 1:
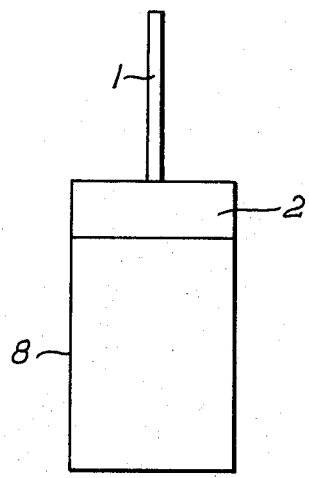
FIG. 1 is an elevational view of an electrolytic capacitor according to this invention.

FIG. 1 illustrates the outer arrangement of an electric construction element of this invention in the form of an electrolytic capacitor. The capacitor is composed of a substrate sintered body 2 made of a metal of the fifth group of the periodic system, tantalum for instance, and provided with an anode terminal 1 and with a cathode enclosure 8.

Figure 2:
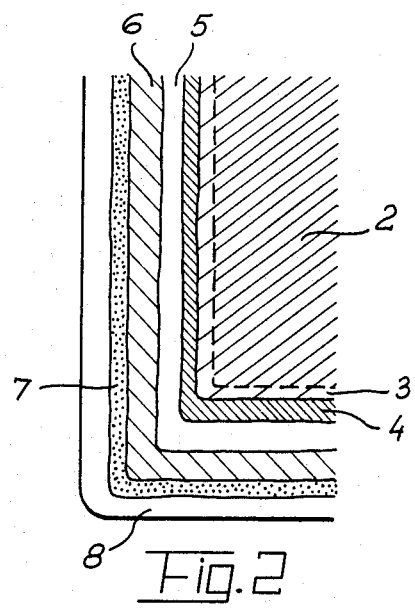
FIG. 2 is an enlarged fragmentary and sectional view of the body of the capacitor of FIG. 1.
Figure 3:
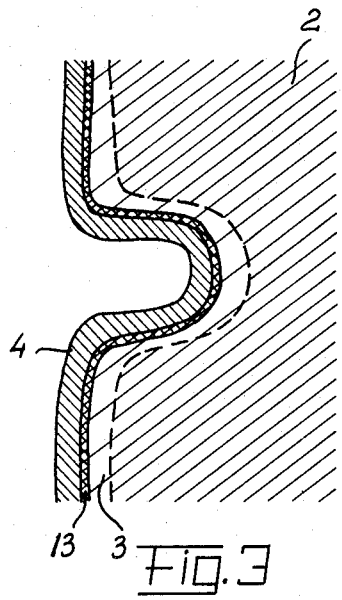
FIG. 3 is a still enlarged fragmentary and sectional view of the highly porous metal substrate of the capacitor of FIG. 1, with the laminations according to this invention.

A section through a portion of the cathode enclosure 8 and the substrate body 2 is shown on an enlarged scale in FIGS. 2 and 3. Prior to the activation (oxidation) of the tantalum substrate body 2, the latter is electrolytically coated with a layer 4 containing a metal of the seventh group of the periodic system, such as manganese dioxide, or a semiconductive material. Subsequently, the highly porous surface of the substrate metal body is in a known suitable manner made sensitive or activated by an electrical or chemical process and, as a consequence thereof, a thin tantalum pentoxide layer 3 forms on the entire porous surface of the body 2 and serves as a dielectricum for the positive electrode (anode) of the electrolytic capacitor. Simultaneously with the activation, there will result an intermediate (mixing) zone 13 between the manganese dioxide layer 4 and the tantalum pentoxide layer 3. This thin separated intermediate zone 13 has semiconductive properties. As seen in FIG. 2, the semiconductive layer 4 may be reinforced by an additional cathodically deposited semiconductive layer 5 and a pyrolitically deposited layer 6 of the manganese dioxide. The layer 6 is covered by graphite and finally by a silver coating 8 by which the laminations of the electrolytic capacitor are completed. It is apparent from FIG. 3 that the porous tantalum anode surface 2 has all surface pores and cavities covered by the semiconductive layer 4 and by the intermediate zone 13 as well as by the dielectric tantalum pentoxide layer 3 in spite of the fact that these pores provide a poor access for the deposition by means of the electrolytic process.

The preferred production method of the electric construction element of this invention resides in the following steps: The highly porous tantalum substrate is first coated with the metal oxide layer 4 by a cathodic precipitation, performed for instance in a diluted aqueous solution of the potassium permanganate corresponding to a concentration of 0.2 N (cca 0/6 weight %) to 0.05 N (cca 0.15 weight %) at an ambient temperature (preferably in the range of 15° to 35° C) and to a electric amount or loading of 1.36 mCb for the molecular thickness on $cm^2$ of the active, that is electrolytically effective surface of the anodic metal body 2 (that is 1.36 mA in the period of 1 second for the molecular thickness of 1 $cm^2$ of the active surface of the anodic metal body 2), the upper limit of the current strength being determined by the gas formation point of the metal in question, that is 0.13 mA/$cm^2$ for tantalum, for example. Subsequently, by means of an anodic formation (oxidation), an oxide layer is produced on the surface of the tantalum substrate, for example in an oxidizing acid of 0.01 to 0.1 percent solution of the nitric acid or phosphoric acid. During this process the anodic metal oxide layer is produced on the surface of the substrate metal under the previously deposited coating of the metal oxide. The two layers have no sharply delimited boundaries but penetrate each other under the formation of an intermediate mixing layer that has semiconductive properties.

Figure 4:
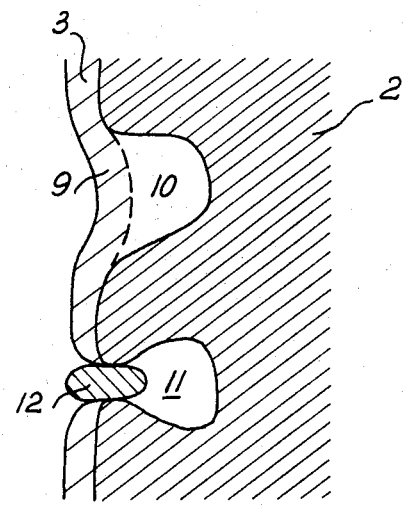
FIG. 4 is a fragmentary sectional view of defects in laminations resulting in prior art construction elements of this type.

In FIG. 4 there are shown two defective sites 10 and 11 which might result on the porous metal substrate 2 if no semiconductive layer 4 or intermediate layer 13 is provided in the electric laminated structural element. The cavity 10 is overgrown by a dielectric layer 3 at 9 due to an accidental gas bubble, whereas the cavity 11 is clogged by an impurity 12 which prevents the cavity 11 from being activated. In both cases a deteriorating effect will result in the electrolytic capacitor, since in the case of overgrowth of the pores the capacity is reduced, and in the case of interruption of the dielectric layer, current leakage and losses occur.

The laminated electric construction element with the semiconductive intermediate zone according to this invention is applicable not only for the production of electrolytic capacitors but it can be modified also in other electric elements. In any event the coating made according to this invention insures that the roughened surface of a metal substrate is covered more uniformly and densely, and that the surface utilization is considerably improved. The resulting electric laminated construction elements have generally a longer working life of the effective layers, higher dielectric strength and better resistance against aggressive chemicals. For example, the electrolytic capacitors manufactured according to the method of this invention show within their working voltage range and at normal polarity an almost constant capacity. If the polarity is reversed, however, the capacity is a function of the applied voltage until a limit capacity is attained and, after the trespassing of this limit capacity, the construction element functions as a variable resistor having inner resistance subject to the applied voltage. The application of such voltage sensitive passive elements is, for example, in the audio frequency techniques.

According to another feature of this invention, the thickness of the laminous structure may be determined by calculation from the current intensity, the time of formation, the geometric surface, the degree of roughening, and from the electrochemical equivalent so as to provide a thickness of the oxide layers in the range of five to 200 molecules. The superposed oxide layers have at an oblique illumination characteristic colors of thin foils. From respective colors the aforementioned thicknesses may be determined. In case of sintered tantalum electrolytic capacitors manufactured according to the method of this invention, the CV-product, that is the produce of their capacity in microfarads and nominal voltage in volts, exceeds two to three times the CV-produce of similar capacitors produced by prior art methods. As mentioned before, the capacitors of this invention vary their capacity in dependence of the applied voltage provided that the polarity is reversed. In this manner the construction elements of this invention may be compared to voltage sensitive condensers or diodes. The thickness of the intermediate zone is also in the range of five to 200 molecules.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A laminated electric construction element comprising, successively arranged, a highly porous substrate of a metal of the fifth group of the periodic system, a metal oxide film of said substrate metal, a metal oxide layer of a metal of the seventh group of the periodic system forming a complete and uniform layer without interruptions, and intermediate semiconductive zone resulting between said metal oxide film and said metal oxide layer, and the thickness of the oxide layer of a metal of the seventh group is in the range of five to 200 molecules.

2. A laminated electric construction element according to claim 1 wherein the thickness of the oxide layer of a metal of the seventh group is in the range of 30 to 100 molecules.

3. A laminated electric construction element according to claim 1 wherein said metal of the fifth group is tantalum and said metal of the seventh group is manganese.

4. A laminated electric construction element according to claim 1 wherein said metal of said metal oxide layer has semiconductive properties, said metal oxide layer being reinforced by additional semiconductive layers, whereby a positive voltage is applied to said substrate metal and a negative voltage to said additional layers in order to produce a polarized electrolytic capacitor.

* * * * *